United States Patent

[11] 3,627,353

[72] Inventors Barry J. Blumenfeld
Randallstown;
William T. Samuelson, Timonium, both of Md.
[21] Appl. No. 873,366
[22] Filed Nov. 3, 1969
[45] Patented Dec. 14, 1971
[73] Assignee Cast Iron Soil Pipe Institute
Washington, D.C.

[54] PIPE JOINT
10 Claims, 5 Drawing Figs.

[52] U.S. Cl. .................................................. 285/39,
285/236, 285/373
[51] Int. Cl. .................................................. F16l 35/00
[50] Field of Search ........................................... 285/373,
236, 419, 365; 24/27, 283, 286; 140/123

[56] References Cited
UNITED STATES PATENTS

| | | | |
|---|---|---|---|
| 2,542,049 | 2/1951 | Newhouse .................... | 24/27 X |
| 3,106,758 | 10/1963 | Abbiati ........................ | 24/27 |
| 3,233,922 | 2/1966 | Evans .......................... | 285/236 |
| 3,359,017 | 12/1967 | Schaub ........................ | 285/236 |
| 3,365,218 | 1/1968 | Denyes ........................ | 285/236 X |

FOREIGN PATENTS 459,499 1/1937 Great Britain ................ 24/27

*Primary Examiner*—Dave W. Arola
*Attorney*—Raphael Semmes

ABSTRACT: A pipe joint for two pipe sections, including an annular packing member of compressible, leakproof material bridging the adjoining pipe sections and a semistiff, flexible clamping band, transversely corrugated substantially throughout its length, overlying the packing member with its longitudinal extremities overlapping. A clamping wire unit secures the clamping band tightly around the packing member and adjoining pipe ends and consists of a single strand of wire bent into the form of a "U" to provide two leg portions or shanks connected by a bight portion. The leg portions are coiled around the clamping band one or more times and passed beneath and through the bight portion, and the respective coils are then tightened by a clamping tool, to compensate for tolerance differences in the pipes being joined simultaneously but independently after which the ends of the leg portions are bent back over the bight portion to lock the coils in their tightened positions. The corrugated clamping band is provided around its periphery with annularly aligned staples which loosely receive the respective wire coils and retain them in place on the clamping band, while permitting their relatively free sliding movement around the clamping band during tightening.

PATENTED DEC 14 1971

INVENTORS
BARRY J. BLUMENFELD
WILLIAM T. SAMUELSON
BY Raphael Semmes
ATTORNEY

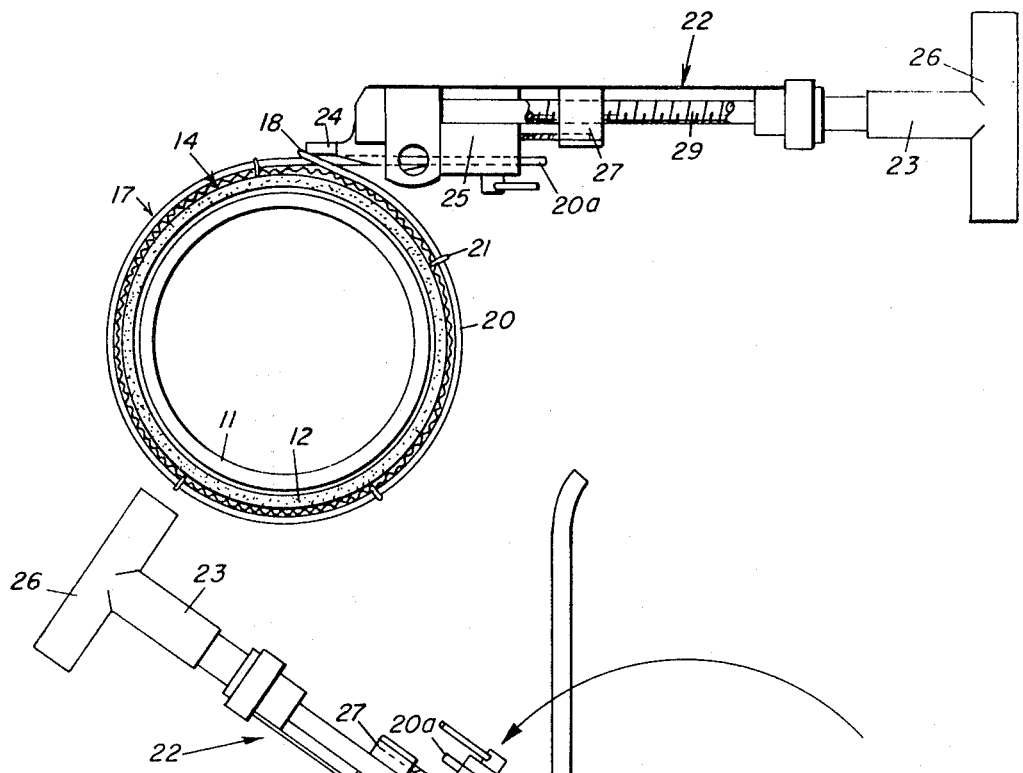
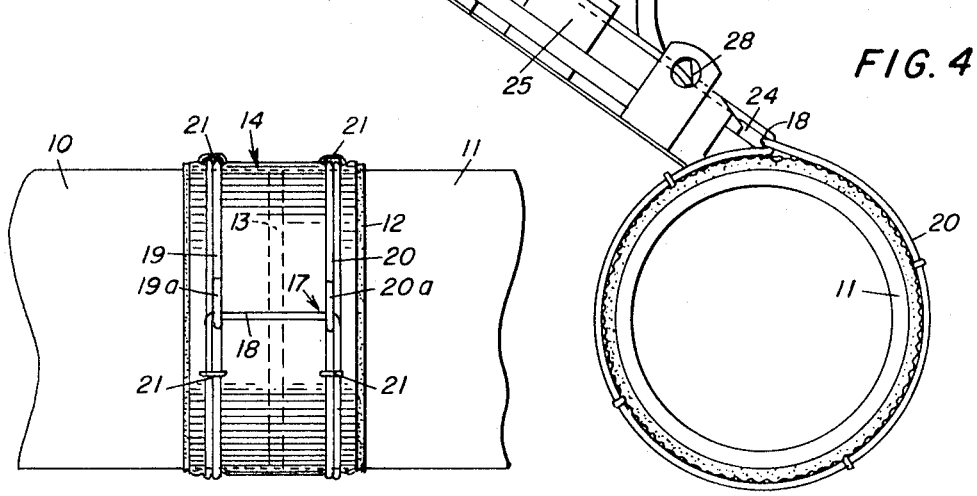
FIG.3
FIG.4
FIG.5
INVENTORS
BARRY J. BLUMENFELD
WILLIAM T. SAMUELSON
BY Raphael Semmes
ATTORNEY

PIPE JOINT

BACKGROUND OF THE INVENTION

A pipe joint such as shown and described in the patent to G. Evans U.S. No. 3,233,922, issued Feb. 8, 1966, embodies a joint designed for connecting aligned sections of cast iron pipe having substantially identical ends, i.e., the joint is not intended for pipe sections having complementary bells and spigots. One of the advantages residing in the Evans pipe joint is that the joining unit may be applied around the adjacent pipe ends to effect a pressure-type seal without appreciably increasing the outer diameter thereof, whereby the pipe may be installed in places where conventionally joined pipes cannot, due to the large size of the bell and spigot joint.

The Evans joint included a corrugated clamping band encircling an annular packing member which bridged the junction between the pipe sections, and the clamping band was tightened about the adjacent pipe ends by the use of two tightening straps encircling the band adjacent each of its longitudinal edges. The tightening straps were separately and individually tightened by screw-type tightening units, and one of the advantages of the joint resides in the fact that the corrugations on the clamping band flex to accommodate variances in pipe size and surface contour.

The primary object of the present invention is to provide a pipe joint which possesses all of the advantages of the Evans joint from the standpoint of versatility, but overcomes the main disadvantage of that joint by providing an improved clamping band tightening and securing means, whereby one clamping tool can equally distribute the tightening load about each of the longitudinal edges of the clamping band in a simultaneous operation to compensate for tolerance differences in the pipes being joined.

Another object of the invention is to particularly adapt a wire clamp for use in tightening the clamping band so that separate loops of a single strand of wire may be simultaneously tightened about the longitudinal edges of the clamping band with an equalized pulling load.

Another object of the invention is to provide a wire-type clamping unit formed of one major part that is practically incapable of being twisted out of operating position when the wire is placed under high tension.

Still another object of the invention is to provide a wire-type clamping unit for use with a corrugated clamping band, including means for retaining the wire loops in proper relative positions on the clamping band while permitting free sliding movement during the tightening operation.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views:

FIG. 3 is an end view of the joint in the course of being tightened, with the pipe sections shown in cross section;

FIG. 4 is a similar view showing the shanks of the wire-clamping unit in locked position; and FIG. 5 is a view in side elevation showing the complete joint in final locked position.

Figure 1:
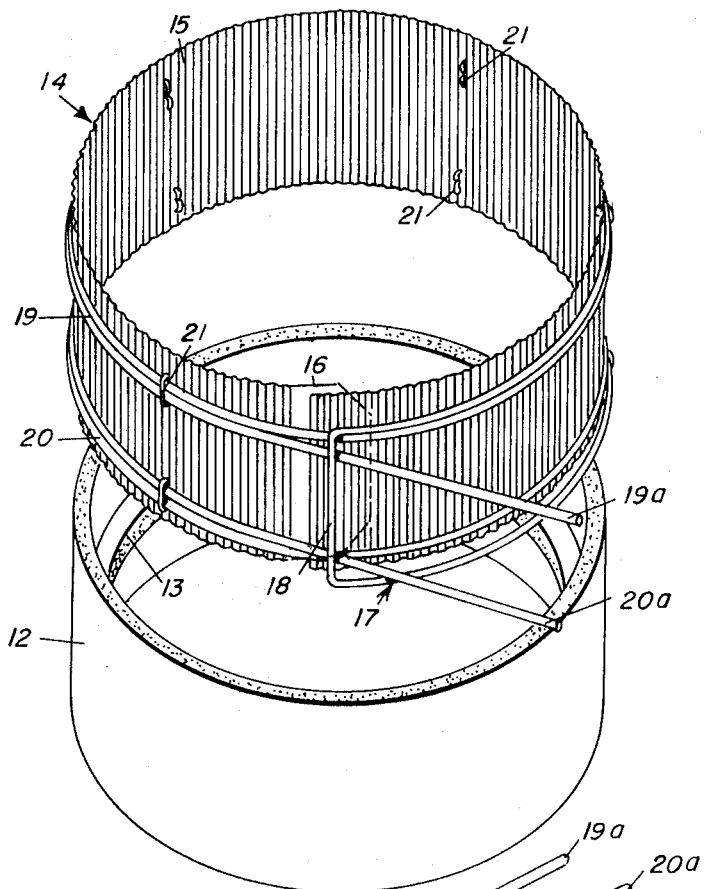
FIG. 1 is a perspective view showing the corrugated clamping band, the wire clamping and holding unit, and the annular packing member.
Figure 2:
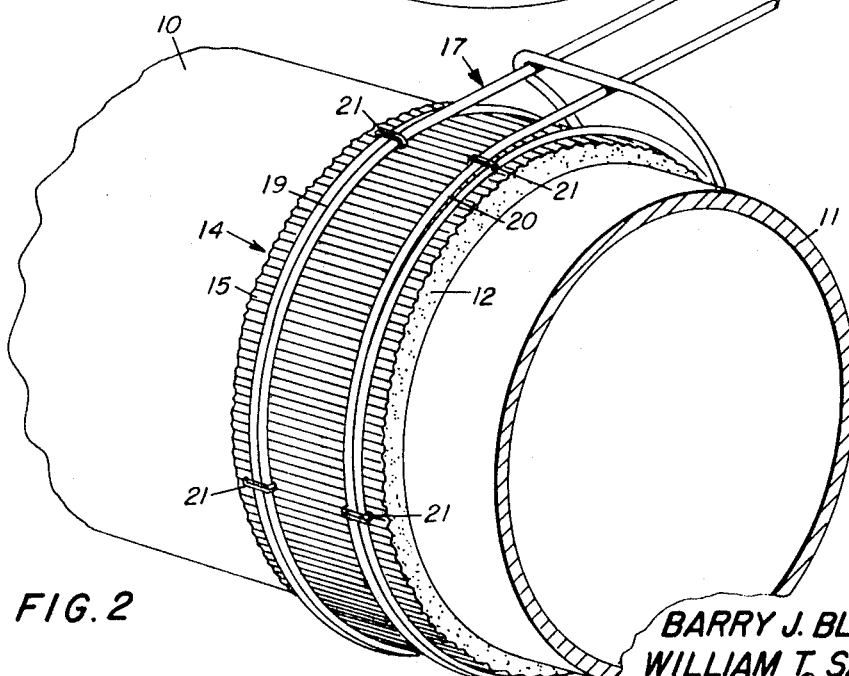
FIG. 2 is a similar view showing these elements in place on the pipe sections to be joined.

Referring first to FIGS. 1 and 2 of the drawings, 10 and 11 represent the two sections of pipe being joined, the pipes being plain end pipes as distinguished from pipes provided with complementary bells and spigots. An annular packing member or sleeve 12 of leakproof, compressible material, such as rubber, surrounds the adjacent ends of the pipe sections, and, in the form of the invention shown in the drawings, this sleeve is provided on its inner surface with a centrally disposed, annular, raised ridge 13 which fits between the aligned pipe ends to prevent actual contact therebetween. A clamping band, generally indicated by the numeral 14, overlies and surrounds the packing member 12 and the adjacent ends of the pipe sections 10 and 11 and is generally similar to the clamping band shown in said Evans U.S. Pat. No. 3,233,922.

This clamping band 14 is preferably made of high-quality stainless steel to provide the strength and corrosion resistance required, and, as seen in FIGS. 1 and 2, is provided with a series of transversely extending corrugations 15 throughout its length. The corrugations now only serve to strengthen the band so as to prevent undue flexing of the assembled joint, but also to facilitate the successful joining of two pipe lengths of slightly different diameters. It may be pointed out that during the manufacture of cast iron pipe, inaccuracies sometimes occur, both in the pipe diameter and in the shape of the pipe, with the result that the diameter might vary as much as one-sixteenth of an inch from the standard size, or the pipe might be somewhat oval in cross section. As previously stated, the corrugations 15 run transversely of the clamping band 14 so that when the band is applied to the adjacent ends of two pipe sections, the corrugations run longitudinally of the pipe, and if the pipe sections are of slightly different diameters, the area of the clamping band surrounding the larger pipe section will expand due to the flattening of the corrugations in that area. This expansion permits tightening of the clamping band about both pipe ends to the same degree with little or no danger of causing the band to buckle, which would otherwise occur with a completely flat band.

To facilitate the overlapping and tightening of the clamping band 14, at least one of its longitudinal extremities is preferably provided with a flat or uncorrugated section 16 over which the opposite end of the band may freely slide in the initial overlapping process.

A wire-clamping unit, generally represented by the numeral 17, comprises a single strand of wire of suitable dimensions initially bent in the form of a "U" to provide a bight 18, with leg portions or shanks 19 and 20 which are coiled around the clamping band 14 one or more times, with the shanks 19a, 20a of the coiled leg portions passing through and under the bight 18 in engagement therewith as seen in FIG. 3. As will later appear, the coils are tightened and clamped about the clamping band by the use of a tool, preferably of the type shown and described in the copending application of Barry J. Blumenfeld and Charles K. Mauer, Ser. No. 873,365, filed concurrently herewith, which simultaneously exerts a pulling force on both of the shanks 19a and 20a, and when the coils are sufficiently tight to clamp the coupling in leakproof engagement with the pipe sections, the shanks of the coiled leg portions are bent back over the bight 18 to lock the coils in their tightened positions. It should be noted that the wire comprising the wire clamping unit should be pliable, yet of sufficient rigidity to retain an abrupt bend when it is clamped over the bight 18.

In order to provide locational control of the wire clamping unit 17 during the coupling installation, a series of annularly aligned staples or the like 21 are secured to the clamping band 14 along each of its longitudinal edges to receive the coiled legs 19 and 20 of the wire-clamping unit 17. The crowns of these staples protrude above the periphery of the clamping band so as to provide sufficient clearance between the clamping band and crowns of the staples to allow the longitudinal sliding movement of the wire legs 19 and 20 with respect to the clamping band, while, at the same time, retaining the coils 19 and 20 in their proper positions on the clamping band prior to and during the tightening operation. It should be understood that the tightening or contraction of the coils 19 and 20 is accomplished with a suitable tool by holding the bight 18 of the wire clamping unit stationary and exerting a pull on the shanks 19a and 20a of the clamping unit. The wire clamping unit 17 of the present invention is particularly adapted for use with the wire clamp applying tool of said copending application Ser. No. 873,365, filed concurrently herewith. However, it will be understood that other tightening tools having the required characteristics may be employed.

The application of the corrugated clamping band and wire-clamping unit to the joint of two sections of pipe will best be understood by reference to FIGS. 3 and 4, where the clamping tool is generally represented by the numeral 22. The particular tool shown in these FIGS. is similar to that shown in our said copending application which comprises a frame 23 having a fulcrum foot 24 at one end for engagement with the bight 18 of the clamping wire. Separate shank gripping blocks 25, one for each of the shanks 19a and 20a, are actuated by the handle 26 through the medium of a pulling block 27 threadedly engaging and actuated by a screw-threaded shaft 29. As described in our said copending application, the relationship of the shank gripping blocks 25 and the pulling block 27 is such that an equalized pulling force is separately and independently applied to the gripping blocks 25 and, in turn, to the shanks 19a and 20a upon the turning of the handle 26 and its threaded shaft, the respective gripping blocks being independently and freely slidable on the shaft 29.

The elements of the joint are first loosely applied to the junction of the two pipe sections being joined, as shown in FIG. 3, and the fulcrum foot 24 of the tool 22 is placed against the bight 18 of the wire-clamping unit, with the shanks 19a and 20a gripped by respective gripping blocks 25. Upon turning the handle 26 and the threaded shaft 29 in clockwise direction, the pulling block 27, in response to the action of the threaded shaft, simultaneously applies a pulling force with an equalized pull on the separate shanks, the bight 18 being held stationary by the fulcrum foot 24 as the coils 19 and 20 are separately tightened about the corrugated clamping band 14. The loosely fitting staples 21, which hold the loops 19 and 20 in their proper relative positions on the corrugated band, permit this equalized pulling force on the shanks 19a and 20a to simultaneously but separately tighten the loops about the joint, thus compensating for any irregularity in the diameters or contours of the two pipes.

After the coils 19 and 20 are sufficiently tight around the respective pipe sections, the tool 22 is bodily rotated about the bight 18 through its fulcrum foot 24 to the position shown in FIG. 4. This action bends the shanks 19a and 20a over the bight 18 to firmly lock the loops in their tightened positions. The excess lengths of the shanks are then cut off by the cutting element 28 described in our said copending application, and the tool is removed from the wire clamp.

After removal of the tool, it is desirable to further bend the clamped shanks down onto the periphery of the corrugated clamping band, and this may be accomplished by simply bending the shanks into their final positions, as shown in FIG. 5.

It will be apparent that the present invention provides a pipe joint which possesses all of the advantages of the joint described in Evans U.S. Pat. No. 3,233,922, but represents a distinct improvement thereover by enabling an operator to simultaneously but independently apply the required pulling force to the respective wire coils encircling the longitudinal edges of the clamping band, so as to automatically accommodate any irregularities or variances in the diameters of the two pipes being joined. Furthermore, the present invention is extremely simple in construction and provides a definitely improved and highly effective clamping tool for the intended purpose.

From the foregoing, it is believed that the invention may be readily understood by those skilled in the art without further description, it being borne in mind that numerous changes may be made in the details disclosed without departing from the spirit of the invention.

We claim:

1. A pipe joint for two sections of pipe in end-to-end relation, comprising, in combination, a clamping band of flexible, semistiff material bridging the adjoining ends of said pipe sections, a wire-clamping unit consisting of a single strand of wire initially bent in the form of a "U" providing two initially parallel leg portions connected by a transverse bight portion, said leg portions being first coiled around the periphery of said clamping band adjacent its opposite edges and then passed beneath and through said bight portion in engagement with the underside thereof, each of said coils being independently responsive to a pulling force exerted on the respective ends of said leg portions projecting beyond said bight portion, and means for simultaneously but independently pulling said respective projecting ends to independently tighten said coils around said clamping band, and then reversely bending said projecting ends over said bight portion.

2. A pipe joint as claimed in claim 1, including a packing sleeve of compressible, leakproof material surrounding the adjoining ends of said pipe sections between the latter and said clamping band.

3. A pipe joint as claimed in claim 1, wherein the longitudinal extremities of said clamping band are arranged in overlapping relation.

4. A pipe joint as claimed in claim 2, wherein the longitudinal extremities of said clamping band are arranged in overlapping relation.

5. A pipe joint as claimed in claim 1, wherein the major position of said clamping band is transversely corrugated.

6. A pipe joint as claimed in claim 5, wherein the longitudinal extremities of said clamping band are arranged in overlapping relation, and one of said longitudinal extremities is devoid of corrugations.

7. A pipe joint as claimed in claim 1, including means on said clamping band for slidably retaining the relative positions of said coils on said band.

8. A pipe joint as claimed in claim 2, including means on said clamping band for slidably retaining the relative positions of said coils on said band.

9. A pipe joint as claimed in claim 5, wherein said clamping band is formed of stainless steel.

10. A pipe joint as claimed in claim 7, wherein said coil retaining means comprises a series of staples secured around the periphery of said clamping band in annularly aligned positions, with a sliding clearance between their crowns and said coils.

* * * * *